United States Patent
Kim

(10) Patent No.: US 8,699,308 B2
(45) Date of Patent: Apr. 15, 2014

(54) TEST RECORDING METHODS FOR AN INFORMATION STORAGE MEDIUM

(71) Applicant: Sang-whook Kim, Suwon-si (KR)

(72) Inventor: Sang-whook Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/678,176

(22) Filed: Nov. 15, 2012

(65) Prior Publication Data

US 2013/0128708 A1     May 23, 2013

(30) Foreign Application Priority Data

Nov. 23, 2011 (KR) .................. 10-2011-0123122

(51) Int. Cl.
*G11B 7/00* (2006.01)
*G11B 7/24* (2013.01)

(52) U.S. Cl.
USPC ..................................... 369/47.53; 369/275.3

(58) Field of Classification Search
None
See application file for complete search history.

(56) References Cited

U.S. PATENT DOCUMENTS

| 6,195,325 | B1 * | 2/2001 | Okanishi | 369/124.08 |
| 8,072,857 | B2 * | 12/2011 | Furumiya | 369/47.53 |
| 2004/0076101 | A1 * | 4/2004 | Suh et al. | 369/59.25 |
| 2004/0090904 | A1 * | 5/2004 | Lee et al. | 369/275.3 |
| 2004/0223427 | A1 * | 11/2004 | Kim et al. | 369/47.12 |
| 2005/0254412 | A1 * | 11/2005 | Ogawa et al. | 369/275.3 |
| 2006/0285460 | A1 * | 12/2006 | Yu et al. | 369/47.53 |
| 2009/0168623 | A1 * | 7/2009 | Furumiya | 369/53.2 |

FOREIGN PATENT DOCUMENTS

KR     10-1049132     7/2011

* cited by examiner

*Primary Examiner* — Peter Vincent Agustin
(74) *Attorney, Agent, or Firm* — NSIP Law

(57) ABSTRACT

Provided are a test method for an information storage medium and a recording and reproducing method using the test method. The test method includes recording a test signal in an optimum power control (OPC) zone formed in either a lead-in area or a lead-out area of the information storage medium, and recording the test signal in a protection zone formed in the other of the lead-in area and the lead-out area.

20 Claims, 2 Drawing Sheets

FIG. 1

|  | START RADIUS (mm) |
|---|---|
| Protection zone 1 | 22.200 |
| PIC | 22.512 |
| Protection zone 2 | 23.252 |
| INFO 2 | 23.289 |
| OPC | 23.329 |
| reserved | 23.647 |
| INFO 1 | 23.961 |
|  | 24.000 |
|  | 58.000 |
| Protection zone 3 | 58.017 |

LEAD-IN AREA: Protection zone 1, PIC, Protection zone 2, INFO 2, OPC, reserved, INFO 1

DATA AREA: 24.000

LEAD-OUT AREA: 58.000, Protection zone 3

TEST RECORDING METHODS FOR AN INFORMATION STORAGE MEDIUM

CROSS-REFERENCE TO RELATED APPLICATION(S)

This application claims the benefit under 35 USC §119(a) of Korean Patent Application No. 10-2011-0123122, filed on Nov. 23, 2011, in the Korean Intellectual Property Office, the entire disclosure of which is incorporated herein by reference for all purposes.

BACKGROUND

1. Field

The following description relates to test recording methods for an information storage medium to ensure recording quality.

2. Description

An optical-disc-type information storage media capable of storing a large amount of data is widely used. In order to record large-sized data on an information storage medium, various methods may be used. For example, the density of recorded data may be increased and the number of recording layers may be increased.

Each recording layer of an information storage medium may include a zone for managing data recording or reproducing. An example of such a zone is an optimum power control (OPC) zone. The OPC zone is a test zone that may be used to perform a test for finding the appropriate power for recording or reproducing data to or from a recordable information storage medium. For example, a rewritable Blu-ray single layer or dual layer disc (BD-RE SL/DL) includes an OPC zone in a lead-in area.

SUMMARY

In an aspect, there is provided a test recording method for an information storage medium, the test recording method including recording a test signal in an optimum power control (OPC) zone formed in one of a lead-in area and a lead-out area of the information storage medium, and recording a test signal in a protection zone formed in the other of the lead-in area and the lead-out area, and reading the recorded test signals.

The test signal may calculate an optimum recording power on an inner circumference of the information storage medium and also on an outer circumference of the information storage medium.

The optimum recording power may be obtained by linearly correcting a recording power calculated in the OPC zone, and a recording power calculated in the protection zone.

The test signal may calculate a parameter that is used to improve recording quality.

The parameter may comprise at least one of a recording focus offset, a recording tracking offset, a recording tilt best point, and a recording spherical aberration best point.

The test signal may calculate a reproducing parameter.

The reproducing parameter may comprise at least one of a reproducing focus offset, a reproducing tracking offset, a reproducing tilt best point, and a reproducing spherical aberration best point.

The information storage medium may comprise the OPC zone only in the lead-in area, and comprise the protection zone in the lead-out area.

The information storage medium may further comprise at least one other protection zone in the lead-in area.

The information storage medium may be a rewritable Blu-ray single layer or dual layer disc (BD-RE SL/DL).

In an aspect, there is provided a recording method for an information storage medium, the recording method including performing a test in an optimum power control (OPC) zone formed in one of a lead-in area and a lead-out area of the information storage medium, and performing a test in a protection zone formed in the other of the lead-in area and the lead-out area, to obtain a test result, and performing a recording operation based on the test result.

The performing of the test may comprise performing a test for calculating an optimum recording power in the OPC zone and the protection zone.

The optimum recording power may be calculated by linearly correcting recording power calculated in the OPC zone, and recording power calculated in the protection zone, and the recording operation may be started from an inner circumference of the information storage medium.

The performing of the test may comprise calculating a parameter that is used to improve recording quality.

The parameter may comprise at least one of a recording focus offset, a recording tracking offset, a recording tilt best point, and a recording spherical aberration best point.

The information storage medium may comprise the OPC zone only in the lead-in area, and comprise the protection zone in the lead-out area.

The information storage medium may further comprise another protection zone in the lead-in area.

The information storage medium may be a rewritable Blu-ray single layer or dual layer disc (BD-RE SL/DL).

In an aspect, there is provided a reproducing method for an information storage medium, the reproducing method including performing a test in an optimum power control (OPC) zone formed in one of a lead-in area and a lead-out area of the information storage medium, and performing a test in a protection zone formed in the other of the lead-in area and the lead-out area, to calculate a reproducing parameter, and performing a reproducing operation based on the calculated reproducing parameter.

The reproducing parameter may comprise at least one of a reproducing focus offset, a reproducing tracking offset, a reproducing tilt best point, and a reproducing spherical aberration best point.

Other features and aspects may be apparent from the following detailed description, the drawings, and the claims.

BRIEF DESCRIPTION OF THE DRAWINGS

FIG. 1 is a diagram illustrating an example of a layout of a rewritable Blu-ray single layer or dual layer disc (BD-RE SL/DL).

Figure 2:
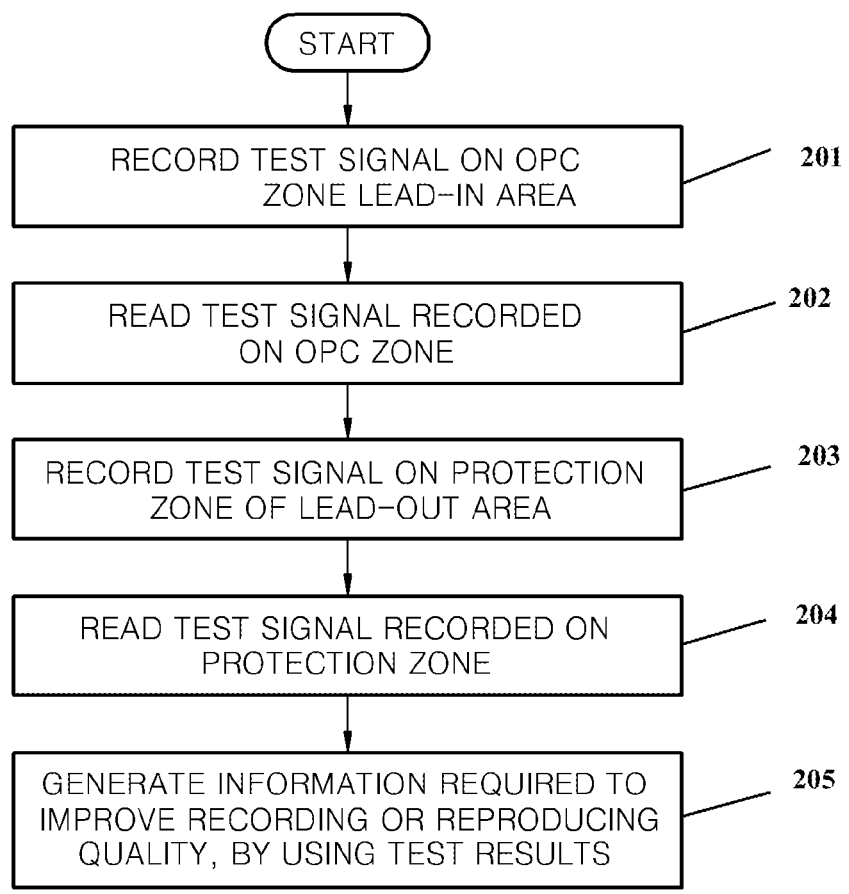
FIG. 2 is a diagram illustrating an example of a test recording method for an information storage medium.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Test recording methods may be used on an information storage medium in which an optimum power control (OPC) zone is formed only in one of a lead-in area and a lead-out area. In this example, a protection zone may be formed in the other area from among the lead-in area and the lead-out area. For example, the test recording methods may be used to record and/or reproduce data to and/or from a disc such as a rewritable Blu-ray single layer or dual layer disc (BD-RE SL/DL).

The OPC zone is a test area that may be used to perform OPC, and the protection zone may be used to protect the disc. For example, the test method may be used to calculate the optimum recording power.

For example, an optimum recording power value may be calculated by performing OPC in the OPC zone formed in the lead-in area of the information storage medium. However, when there is a difference in the power sensitivity between an inner and an outer circumference of an information storage medium on which data is to be recorded, the recording quality may not be easily ensured. That is, because the optimal recording power at the inner circumference is different from that at the outer circumference, using the same recording power throughout the disc will not generate an optimal recording quality for the entire width of the disc.

According to various aspects, a protection zone formed in one of a lead-in area and a lead-out area, in which an OPC zone is not formed, is also used as a test area for adjusting the recording power.

Furthermore, the test method may be used to calculate an additional parameter that is used to improve the recording quality as well as to control the optimum recording power. For example, the additional parameter may include one or more of a recording focus offset, a recording tracking offset, a recording tilt best point, a recording spherical aberration best point, and the like. In addition, the test method may be used to calculate a parameter that is used to improve the reproducing quality. For example, the parameter used to improve the reproducing quality may be at least one of a reproducing focus offset, a reproducing tracking offset, a reproducing tilt best point, a reproducing spherical aberration best point, and the like.

FIG. 1 illustrates an example of a layout of a BD-RE SL/DL.

Referring to FIG. 1, the BD-RE SL/DL includes a lead-in area, a data area, and a lead-out area from an inner circumference of the disc. In the BD-RE SL/DL of this example, an OPC zone for performing OPC is formed as a test zone in the lead-in area, and is not formed in the lead-out area. A plurality of protection zones for protecting the disc are formed in the lead-in area and the lead-out area. For example, two protection zones may be formed in the lead-in area, and one protection zone may be formed in the lead-out area.

In this example, a permanent information and control data (PIC) zone and two information zones INFO 1 and INFO 2 are formed in the lead-in area. Also, a zone adjacent to the OPC zone remains as a reserved zone.

The protection zone formed closest to the inner circumference of the disc in the lead-in area is referred to as protection zone 1, the protection zone formed closest to an outer circumference of the disc in the lead-out area is referred to as protection zone 3, and the protection zone formed between the PIC zone and the information zone INFO 2 in the lead-in area is referred to as protection zone 2. In this example, the protection zone 2 may act as a buffer zone for a changeover between an embossed PIC zone and a recordable zone.

The protection zone 1, the PIC zone, the protection zone 2, the information zone INFO 2, the OPC zone, the reserved zone, and the information zone INFO 1 may be formed in the lead-in area in the order from the inner circumference of the disc, however, the aspects herein are not limited thereto. For example, it should also be understood that the disc may include a different arrangement of zones and/or a different amount and/or type of zones.

A BD-RE SL may include a single recording layer having the layout shown in FIG. 1. A BD-RE DL may include two recording layers having the layout shown in FIG. 1. That is, in the BD-RE DL, layer 0 and layer 1 may have the layout shown in FIG. 1, and a zone closest to the inner circumference in the lead-in area of the layer 0 may be formed as a burst cutting area (BCA) for recording disc information. The BCA may be used to record information about the disc, for example, a serial number of the disc and encryption information for preventing the disc from being copied.

The PIC zone may be used to record disc management information as an embossed high frequency modulated (HFM) signal. For example, the PIC zone may be used to record general information of the disc which is to be permanently retained, and may have HFM grooves for recoding disc information (DI). The DI recorded on the PIC zone may include a DI identifier (ID), disc structure information, reproducing power information, recording power information, and the like. The recording power information may include optical recording power information at a general recording speed, optical recording power information at a maximum recording speed, and optical recording power information at a minimum recording speed, which may be used to adjust optical recording power.

Accordingly, in a recording operation, the optical recording power information recorded on the PIC zone may be read, optical power of a laser source included in an optical pick-up may be variably adjusted using the read optical recording power information, and the recording operation may be performed on an information storage medium. In addition to the above basic optical recording power information, optimum recording power may be detected by performing an OPC operation and thus the recording quality may be ensured. In a test method for an information storage medium, according to various aspects, an OPC operation may be performed using test zones, for example, the OPC zone formed in the lead-in area and also the protection zone (the protection zone 3 in BD-RE SUDL) formed in the lead-out area.

The BD-RE SL/DL may record data into grooves on a recording layer having a land/groove structure. For example, the grooves may be classified into HFM grooves and wobbled grooves. The wobbled grooves may use various modulation methods, for example, a method using minimum shift keying (MSK) modulation together with harmonic modulated wave (HMW) modulation (this is referred to as 'MSK+HMW modulation'), a method using only MSK modulation, and the like. As an example, the wobbled grooves may have a wobbled shape that is obtained by modulating the grooves of the recording layer based on a sinusoidal curve. Due to the wobbled shape, a system of an optical information storage medium may read address information of a corresponding groove (an address in pre-groove (ADIP)) and general disc information.

As an example, the protection zone 1 and the PIC zone in the lead-in area may be formed of HFM modulated grooves, the protection zone 3 in the lead-out area may be formed of wobbled grooves using MSK modulation, and the other zones in the lead-in area, the lead-out area, and the data area may be formed of wobbled grooves using MSK+HMW modulation.

The protection zone 3 in the lead-out area may be formed of wobbled grooves using MSK modulation, and no other information may be recorded thereon. For example, the protection zone 3 in the lead-out area may be used to measure a harmonic distortion of a wobbled signal using a spectrum analyzer, in order to check wobbled characteristics of an information storage medium, and to check whether this zone is restricted as a recording zone or a no recording zone. Accordingly, the protection zone 3 in the lead-out area may be used as a test zone as in a test method for an information storage medium.

According to various aspects, a test method for an information storage medium and a recording or reproducing method using the test method may be used for an information storage medium in which only one of a lead-in area and a lead-out area includes an OPC zone. In various aspects, the other of the lead-in area and the lead-out area includes one or more protection zones. For example, the test method and the recording or reproducing method may be used for an information storage medium, e.g., a BD-RE SL/DL, in which only a lead-in area includes an OPC zone, and a lead-out area does not include an OPC zone. In the example of FIG. 1, the lead-in area may also include at least one protection zone. For convenience of explanation, a case when only a lead-in area includes an OPC zone and a lead-out area includes a protection zone is described with reference to FIG. 2.

FIG. 2 illustrates an example of a test method for an information storage medium.

In order to obtain information to improve the recording or reproducing quality by testing an information storage medium, initially, a test signal is recorded on an OPC zone of a lead-in area in 201, and the test signal recorded on the OPC zone is read to obtain a test result in 202. Next, a test signal is recorded on a protection zone of a lead-out area in 203, and the test signal recorded on the protection zone is read to obtain a test result in 204.

For example, the recording and reading of the test signal may be initially performed on the protection zone of the lead-out area and then may be performed on the OPC zone of the lead-in area, or vice versa. As another example, the recording of the test signal may be performed simultaneously on both the OPC zone of the lead-in area and the protection zone of the lead-out area, and the reading of the test signal may be performed thereafter.

Using the test results, information used to improve the recording or reproducing quality is generated in 205. Accordingly, when a recording or reproducing operation is performed using the generated information, the recording or reproducing quality may be ensured.

The information used to improve the recording quality includes optimum recording power for performing OPC. In addition, the information may further include, for example, a recording focus offset, a recording tracking offset, a recording tilt best point, a recording spherical aberration best point, and the like. The information used to improve the reproducing quality may include, for example, a reproducing focus offset, a reproducing tracking offset, a reproducing tilt best point, a reproducing spherical aberration best point, and the like.

According to various aspects, a test signal for performing OPC may be recorded on the OPC zone of the lead-in area, and may be read to calculate recording power for an inner circumference of a disc. In addition, a test signal for performing OPC may be recorded on the protection zone of the lead-out area (the protection zone 3 of a BD-RE SL/DL in FIG. 1), and may be read to calculate recording power for an outer circumference of the disc.

In one example, if there is no difference in the power sensitivity between the recording powers for the inner circumference and the outer circumference of the disc may have almost the same value.

However, when there is a difference in the power sensitivity between the recording powers for the inner circumference and the outer circumference of the disc, the recording power calculated in the OPC zone and the recording power calculated in the protection zone may have different values. In this case, as an example, the optimum recording power may be obtained by linearly correcting the recording power calculated in the OPC zone of the lead-in area and the recording power calculated in the protection zone of the lead-out area. Accordingly, when a recording operation is performed using the obtained optimum recording power, data may be recorded at a high quality.

As an example, a difference in recording power may be gradually increased or reduced from the inner circumference to the outer circumference of the disc, to linearly correct the recording power.

According to various aspects, a test may be performed in each of an OPC zone formed in one of a lead-in area and a lead-out area of an information storage medium, and performed in a protection zone formed in the other of the lead-in area and the lead-out area. Accordingly, a recording operation may be performed by using the test results. For example, the test may be performed for calculating the optimum recording power in the OPC zone and the protection zone. In some examples, the optimum recording power may be calculated by linearly correcting the recording power calculated in the OPC zone and the recording power calculated in the protection zone, and the recording operation may be started from an inner circumference of a disc.

For example, the above test method may also be used to calculate at least one of a recording focus offset, a recording tracking offset, a recording tilt best point, and a recording spherical aberration best point which are other parameters used to improve the recording quality.

Furthermore, the above test method may also be used to calculate a reproducing parameter for improving the reproducing quality, and to perform a reproducing operation using the calculated reproducing parameter.

In a recording operation, when the optimum recording power or another parameter used to improve the recording quality, which is obtained as described above, is used, a high quality recording may be ensured. Also, in a reproducing operation, when a parameter used to improve the reproducing quality, which is obtained as described above, is used, a high quality reproducing may be ensured.

In various examples herein, an outer circumference of a disc may have a test recording performed therein to determine an optimum recording power of the outer circumference of the disc. Furthermore, the inner circumference of a disc may have a test recording performed therein to determine an optimum recording power of the inner circumference of the disc.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A test recording method for an information storage medium, the test recording method comprising:
   recording a test signal in an optimum power control (OPC) zone formed in a lead-out area of the information storage medium;
   recording a test signal in a protection zone formed in a lead-in area; and
   reading recorded test signals.

2. The test recording method of claim 1, wherein the recorded test signals are used to calculate an optimum recording power on an inner circumference of the information storage medium and also on an outer circumference of the information storage medium.

3. The test recording method of claim 2, wherein the optimum recording power is obtained by linearly correcting a recording power calculated in the OPC zone, and a recording power calculated in the protection zone.

4. The test recording method of claim 1, wherein the recorded test signals are used to calculate a parameter that is used to improve recording quality.

5. The test recording method of claim 4, wherein the parameter comprises at least one of a recording focus offset, a recording tracking offset, a recording tilt best point, and a recording spherical aberration best point.

6. The test recording method of claim 1, wherein the recorded test signals are used to calculate a reproducing parameter.

7. The test recording method of claim 6, wherein the reproducing parameter comprises at least one of a reproducing focus offset, a reproducing tracking offset, a reproducing tilt best point, and a reproducing spherical aberration best point.

8. The test recording method of claim 1, wherein the information storage medium comprises the OPC zone only in the lead-in area, and comprises the protection zone in the lead-out area.

9. The test recording method of claim 8, wherein the information storage medium further comprises at least one other protection zone in the lead-in area.

10. The test recording method of claim 8, wherein the information storage medium is a rewritable Blu-ray single layer or dual layer disc (BD-RE SL/DL).

11. The recording method of claim 1, the recording method further comprising:
    performing a test to obtain a test result; and
    performing a recording operation based on the test result.

12. The recording method of claim 11, wherein the performing the test comprises performing a test for calculating an optimum recording power in the OPC zone and the protection zone.

13. The recording method of claim 12, wherein the optimum recording power is calculated by linearly correcting recording power calculated in the OPC zone, and recording power calculated in the protection zone, and
    the recording operation is started from an inner circumference of the information storage medium.

14. The recording method of claim 11, wherein the performing the test comprises calculating a parameter that is used to improve recording quality.

15. The recording method of claim 14, wherein the parameter comprises at least one of a recording focus offset, a recording tracking offset, a recording tilt best point, and a recording spherical aberration best point.

16. The recording method of claim 11, wherein the information storage medium comprises the OPC zone only in the lead-in area, and comprises the protection zone in the lead-out area.

17. The recording method of claim 16, wherein the information storage medium further comprises another protection zone in the lead-in area.

18. The recording method of claim 16, wherein the information storage medium is a rewritable Blu-ray single layer or dual layer disc (BD-RE SL/DL).

19. A reproducing method for an information storage medium, the reproducing method comprising:
    performing a test in an optimum power control (OPC) zone formed in a lead-out area of the information storage medium, and performing a test in a protection zone formed in a lead-in area of the information storage medium to calculate a reproducing parameter; and
    performing a reproducing operation based on the calculated reproducing parameter.

20. The reproducing method of claim 19, wherein the reproducing parameter comprises at least one of a reproducing focus offset, a reproducing tracking offset, a reproducing tilt best point, and a reproducing spherical aberration best point.

* * * * *